(12) United States Patent
Irazabal

(10) Patent No.: US 11,044,104 B2
(45) Date of Patent: Jun. 22, 2021

(54) DATA CERTIFICATION AS A SERVICE POWERED BY PERMISSIONED BLOCKCHAIN NETWORK

(71) Applicant: International Business Machines Corporation, Armonk, NY (US)

(72) Inventor: Jeronimo Irazabal, Buenos Aires (AR)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 16/122,130

(22) Filed: Sep. 5, 2018

(65) Prior Publication Data
US 2020/0076619 A1 Mar. 5, 2020

(51) Int. Cl.
| | | |
|---|---|---|
| *H04L 9/32* | (2006.01) | |
| *H04L 9/06* | (2006.01) | |
| *G06F 16/27* | (2019.01) | |
| *G06F 16/18* | (2019.01) | |
| *G06F 16/182* | (2019.01) | |

(52) U.S. Cl.
CPC ........ *H04L 9/3268* (2013.01); *G06F 16/1805* (2019.01); *G06F 16/1834* (2019.01); *G06F 16/27* (2019.01); *H04L 9/0643* (2013.01); *H04L 2209/38* (2013.01)

(58) Field of Classification Search
CPC . H04L 9/3268; H04L 9/0643; H04L 2209/38; G06F 16/27; G06F 16/1805; G06F 16/1834
See application file for complete search history.

(56) References Cited

U.S. PATENT DOCUMENTS

| | | |
|---|---|---|
| 6,895,507 B1 | 5/2005 | Teppler |
| 7,546,384 B1 | 6/2009 | Chatt et al. |
| 8,473,585 B1 * | 6/2013 | Smith ................. H04L 67/1097 709/219 |
| 9,225,746 B2 | 12/2015 | Osborne et al. |
| 9,602,288 B1 | 3/2017 | Mikulski et al. |
| 9,774,578 B1 | 9/2017 | Ateniese et al. |
| 2005/0133582 A1 | 6/2005 | Bajikar |
| 2006/0080536 A1 | 4/2006 | Teppler |
| 2017/0031676 A1 | 2/2017 | Cecchetti et al. |
| 2018/0089683 A1 * | 3/2018 | Setty .................. G06Q 20/3825 |
| 2018/0117446 A1 * | 5/2018 | Tran ..................... H04L 9/3236 |

FOREIGN PATENT DOCUMENTS

WO 2017187397 A1 11/2017

OTHER PUBLICATIONS

A. Dorri, "LSB: A Lightweight Scalable BlockChain for IoT Security and Privacy." (Submitted on Dec. 8, 2017). https://arxiv.org/abs/1712.02969.

(Continued)

*Primary Examiner* — Ayoub Alata

(57) ABSTRACT

An example operation may include one or more of registering data values, by a plurality of IoT devices, each IoT device associated with one of at least two different cloud storages, the registration of the data values having a relative order, and only one measurement being made for each IoT device per measurement at a given point in time, and proving a common ordering of at least some of the data values registered by the plurality of IoT devices, by a client application of a client device.

18 Claims, 12 Drawing Sheets

(56) References Cited

OTHER PUBLICATIONS

A. Dorri, "Towards an Optimized BlockChain for IoT." In Proceedings of the Second International Conference on Internet-of-Things Design and Implementation (IoTDI '17). ACM, New York, NY, USA, 173-178, 2017.

Anonymous, "Protocol for Enabling Secure Smart Home Network Communication in IoT." IP.com Disclosure No. IPCOM000247757D, Publication Date: Oct. 6, 2016.

Anonymous, "Secure and Light Weight communication approach for IoT Devices." IP.com Disclosure No. IPCOM000247188D, Publication Date: Aug. 15, 2016.

European Union Agency for Network and Information Security, "Distributed Ledger Technology & Cybersecurity," Dec. 2016, https://www.enisa.europa.eu/publications/blockchain-security/.

H. Malviya, "How Blockchain will Defend IOT." White Paper (Dec. 10, 2016). Available at SSRN: https://ssrn.com/abstract=2883711 or http://dx.doi.org/10.2139/ssrn.2883711.

IBM, "Adept: An IoT Practitioner Perspective," White paper, 2015. IBM Institute for Business Value.Visit ibm.biz/devicedemocracy.

J. Chen, "Flowchain: A Distributed Ledger Designed for Peer-to-Peer IoT Networks and Real-time Data Transactions." In: 2nd International Workshop on Linked Data and Distributed Ledgers. Portoroz, 2017.

Samaniego, "Blockchain as a Service for IoT," 2016 IEEE International Conference on Internet of Things (iThings) and IEEE Green Computing and Communications (GreenCom) and IEEE Cyber, Physical and Social Computing (CPSCom) and IEEE Smart Data (SmartData), Chengdu, 2016, pp. 433-436.

\* cited by examiner

US 11,044,104 B2

DATA CERTIFICATION AS A SERVICE POWERED BY PERMISSIONED BLOCKCHAIN NETWORK

TECHNICAL FIELD

This application generally relates to data certification, and more particularly, to data certification as a service powered by a permissioned blockchain network.

BACKGROUND

By 2020, it is estimated that there will be approximately 21 billion connected IoT devices around the globe. IoT devices typically generate a large amount of data that is then consumed by different applications. However, it can be difficult to certify that data has not been modified once registered by the IoT device. In other words, it can be difficult for an end-user application (i.e., a "client application") to validate that the data it consumes was not tampered with, generated on the fly, or registered multiple times with different values. While it is outside of the scope of the client application to validate that data has not been tampered with, generated on the fly, or have multiples values for the same timestamp. It is also outside the scope of the client application to be able to order the data, including when multiple data storage sources are involved. This ordering may be important for the client application. Accordingly, an improved approach to data certification for IoT devices and other devices may be beneficial.

SUMMARY

One example embodiment may provide a system that includes one or more of a plurality of devices configured to register data, a plurality of peer devices, wherein at least one peer device is associated with each of at least two cloud storages, and a client device that runs a client application, wherein the plurality of devices are configured to perform one or more of register data values, the registration of the data values having a relative order, and only one measurement being made for each device per measurement at a given point in time, and the client application is configured to prove a common ordering of at least some of the data values registered by the plurality of devices.

Another example embodiment may provide a computer-implemented method that includes one or more of registering data values, by a plurality of IoT devices, each IoT device associated with one of at least two different cloud storages, the registration of the data values having a relative order, and only one measurement being made for each IoT device per measurement at a given point in time, and proving a common ordering of at least some of the data values registered by the plurality of IoT devices, by a client application of a client device.

A further example embodiment may provide a computer-implemented method that includes one or more of registering data values, by a plurality of IoT devices, each IoT device associated with one of at least two different cloud storages, the registration of the data values having a relative order, and only one measurement being made for each IoT device per measurement at a given point in time, requesting, by a client application of a client device, actual data registered by the plurality of IoT devices in the at least two cloud storages and cryptographic proofs that the data was previously stored and not generated when the data was requested by the client application, and proving a common ordering of at least some of the data values registered by the plurality of IoT devices using the cryptographic proofs, by the client application of the client device.

DETAILED DESCRIPTION

Figure 1:
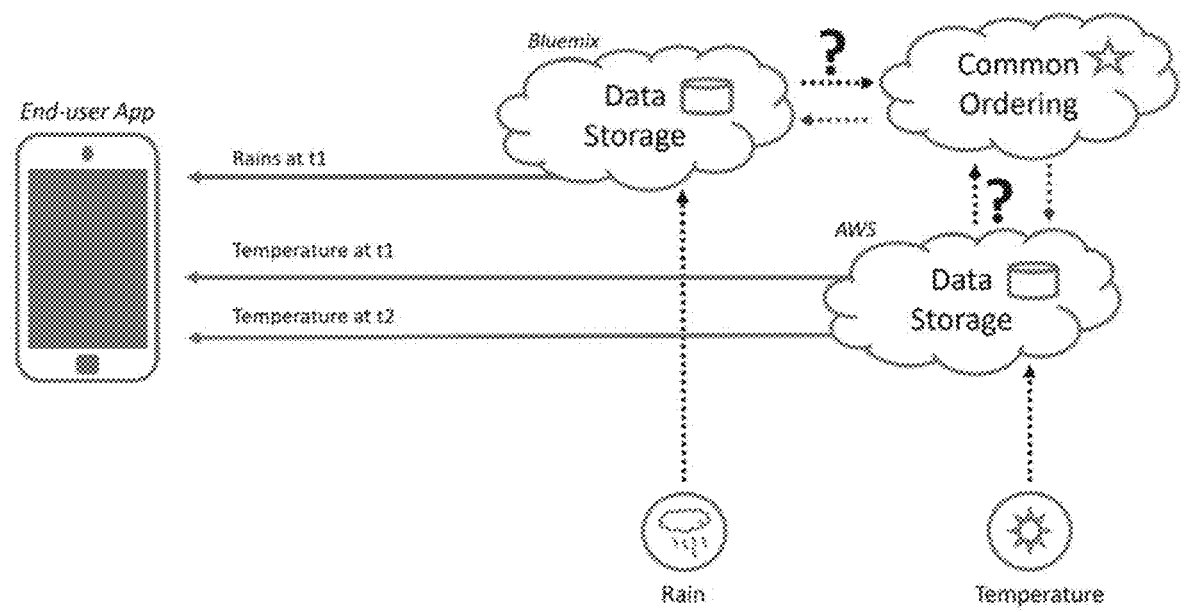
FIG. 1 illustrates an example for a weather application were the order of registration matters.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, devices, networks and/or systems that provide data certification as a service powered by a permissioned blockchain network. Some or all of the devices may be Internet-of-Things (IoT) devices in some embodiments.

A blockchain is a distributed system that includes multiple nodes that communicate with each other. A blockchain operates programs called "chaincode" (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and have an effect on the state of the blockchain. Other transactions that are not endorsed are disregarded. There may exist one or more special chaincodes for management functions and parameters, collectively called "system chaincodes."

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node that submits a transaction-invocation to an endorser (e.g., a peer), and broadcasts transaction-proposals to an ordering service (e.g., an ordering node). Another type of node is a peer node that can receive client submitted transactions, commit the transactions, and maintain a state and a copy of the ledger of blockchain transactions. Peer nodes (or peers) can also have the role of an endorser, although this is not a requirement. An ordering-service-node, or orderer node, is a node running the communication service for all nodes. The orderer node implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) that is used to store an immutable, sequenced record in blocks. The ledger also includes a state database that maintains a current state of the blockchain. There is typically one ledger per channel. Each peer node maintains a copy of the ledger for each channel of which they are a member.

A distributed ledger is a ledger that is replicated in whole or in part to multiple computers. A Cryptographic Distributed Ledger (CDL) can have at least some of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), and/or verifiability (all transactions can be cryptographically verified). A blockchain is an example of a CDL. While the description and figures herein are described in terms of a blockchain, the subject application applies equally to any CDL.

A distributed ledger is a continuously growing list of records that typically apply cryptographic techniques such as storing cryptographic hashes relating to other blocks. A blockchain is one common instance of a distributed ledger and may be used as a public ledger to store information. Although, primarily used for financial transactions, a blockchain can store various information related to goods and services (i.e., products, packages, status, etc.). A decentralized scheme provides authority and trust to a decentralized network and enables its nodes to continuously and sequentially record their transactions on a public "block", creating a unique "chain" referred to as a blockchain. Cryptography, via hash codes, is used to secure an authentication of a transaction source and removes a central intermediary. A blockchain is a distributed database that maintains a continuously-growing list of records in the blockchain blocks, which are secured from tampering and revision due to their immutable properties. Each block contains a timestamp and a link to a previous block. A blockchain can be used to hold, track, transfer, and verify information. Since blockchain is a distributed system, before adding a transaction to the blockchain ledger, all peers typically need to reach a consensus status.

A chain is a transaction log that is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Whenever a transaction is committed into the ledger and the state is updated based on the transaction results, a timestamp is calculated for the updated keys based on the order in which such transaction was stored. If, however, the smart contract involves more keys that are not modified in the current transaction, a modification is not made to those keys.

Some embodiments provide data certification as a service powered by a permissioned blockchain network. Some or all of the devices may be Internet-of-Things (IoT) devices in some embodiments, and reference is often made to IoT devices performing the operations described herein. However, some or all of the devices may not be IoT devices without deviating from the scope of the embodiments.

The certification provided by the service may take as input evidence from the IoT device (rather than the actual data recorded by the device), as evidenced by the client application (i.e., client) via the immutable registry of the network, and generate a cryptographic proof that certifies that the data was already registered by the IoT device, and has not been modified since registration occurred. A benefit to client applications is that they do not need to trust the IoT devices in generating and storing the data, nor do they need to trust the service providing the certification. Information will be signed, cryptographically linked, and published in some embodiments. In contrast with existing approaches, the solution of some embodiments charges a fee to the client for providing a cryptographic proof of the source of the data (i.e., the respective device) in such a way that the client does not need to trust the IoT device or the service in this regard. The role of the client application in some embodiments, at least in part, is to validate the data fetched from several cloud storages, validate non-duplicated measurements for the same device (or data producer) at the same time, validate that the information had been already stored before requested, and determine the relative order of measurements even when the measurements are stored in different cloud storages.

In some embodiments, IoT devices are the source of the data. The data may be stored in another platform (e.g., cloud-based servers), but each IoT device cryptographically links all generated data and signs it before sending for storage in some embodiments. The cryptographic linking may be nearly identical to the way blocks are linked in the ledger in embodiments that contemplate this linking and signing from IoT devices. Each IoT device may have a certificate including a public and private key pair. Each time data is uploaded for storage, it may include the signature of the digest of the data. However, it should be noted that the linking and signing by IoT devices is not mandatory for the whole solution in some embodiments. In certain embodiments, a point of novelty or feature is the combination of a private/local ledger for each cloud storage with a shared ledger between different cloud storages that allow them to maintain a common global order of all measurements. In some embodiments, each cloud storage maintains a private ledger for the settlement of the data stored on that cloud storage and maintains a shared ledger together with other cloud storages, in which derived information from the private ledgers is settled.

The IoT devices may also send the current cryptographic value (e.g., a local "current hash") to the blockchain network. Whenever a client application seeks certification that the data is actually that which was originally provided from an IoT device, via the storage platform, the client application can request a proof to the service backed by the blockchain network. The cryptographic proof that is obtained from the service can be verified by the client application, thus guaranteeing with a very high probability that the data was indeed previously registered by the IoT device and not altered since registration occurred. The service may charge an owner of the client application based on the length of the cryptographic proof. To charge for this service, the use of tokens can be maintained with a smart contract.

Because the service is backed by a permissioned blockchain network in some embodiments, in order to provide a higher level of trust, the current hash of the network may be available at any time for the clients. The current hash may be the hash of the last block of the shared ledger. The service may be able to generate proof of the relative order of data registered by different IoT devices. This functionally may be hard, or even impossible, to achieve for applications consuming data from IoT devices known at runtime without relying on the novel service of some embodiments. Applications consuming data from untrusted devices, or seeking a certification that the data was not tampered with, may benefit from the relative ease of implementation when relying on such embodiments.

FIG. 1 illustrates an example 100 for a weather application where the order of registration matters. In this example, rain information is stored in an IBM Bluemix™ database and temperature information is stored in an Amazon Web Services™ (AWS) database. However, since data may have been registered a short time after the request rather than when the event associated with the data occurred, for instance, how to provide and verify a common ordering based on registration is a problem with respect to rain at t1, the temperature at t1, and the temperature at t2. For example, if the temperature at t2 was registered before rain at t1, then the temperature at t2 or the rain at t1 may not be used by an end-user application. It should also be possible to provide proof that at most one value was registered at that specific point in time.

Figure 2:
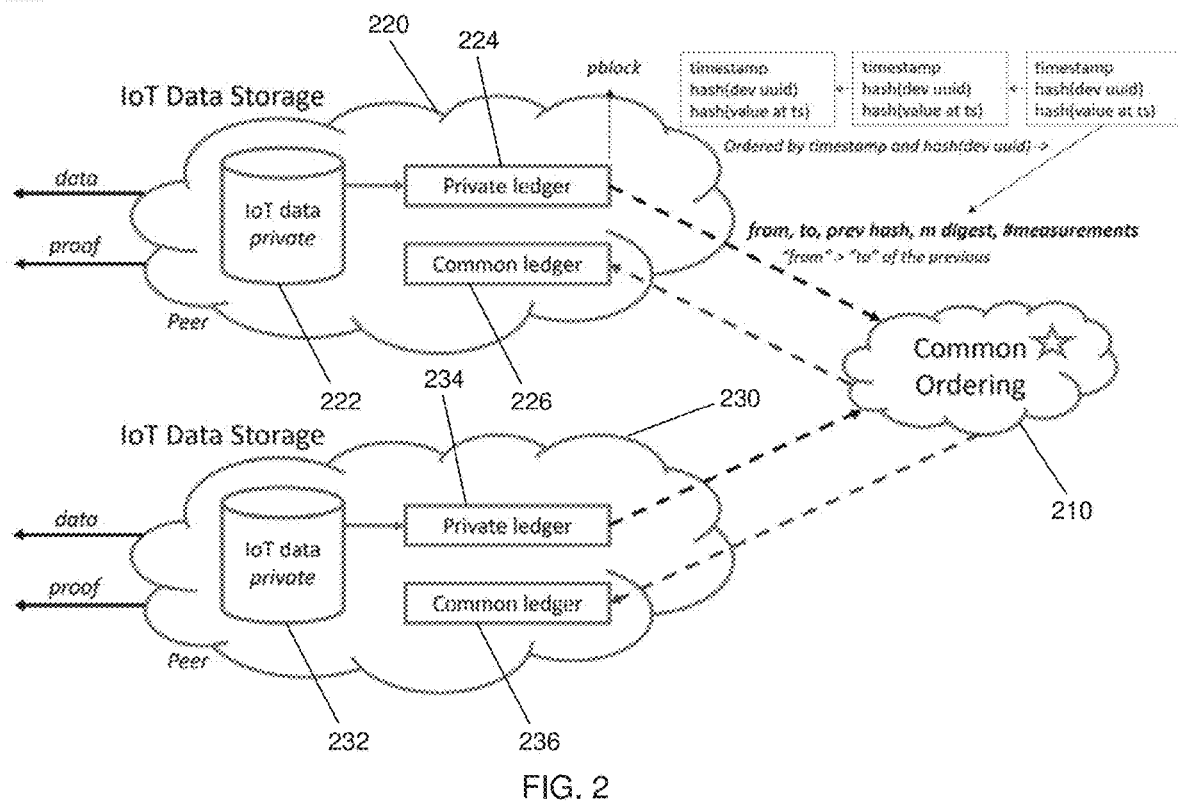
FIG. 2 illustrates an architecture for proving a common ordering, according to example embodiments.

FIG. 2 illustrates an architecture 200 for proving a common ordering 210, according to example embodiments. In FIG. 2, a first peer 220 is an IoT device. However, in some embodiments, the peers in the cloud storages that maintain a private ledger based on data uploaded by IoT devices are not themselves IoT devices. In the context of some embodiments, IoT devices are the data producers that upload data to be stored in the cloud storage platforms. The client application then can be running on an IoT device or any other device (e.g., a desktop or smart phone application or service).

In the context presented herein, IoT devices such as first peer 220 are not peers of the blockchain network. Each cloud storage (e.g., IBM Bluemix or Amazon AWS) may run several peers. Peers belonging to the same cloud storage generate a private ledger with the data provided by IoT devices, and those peers also maintain a shared ledger with the peers of the other cloud storage. However, instead of interchanging the actual data provided by IoT devices, the information settled on the shared ledger includes data with the form of "from-to, prevhash, m digest, #measurements". This data is derived from the private ledger and is also called a "pblock" herein. "from-to" is the next period to settle on the shared ledger, "prevhash" corresponds to the current hash of the private ledger, "m digest" corresponds to the hash calculated for all the entries made on the private ledger in such a period and the number of measurements (i.e., the number of data measurements provided by IoT devices) in such a period.

First peer 220 includes a private IoT database 222, a private ledger 224, and a common, or shared, ledger 226. A second peer 230, which is also an IoT device, also includes its own private IoT database 232, private ledger 234, and common ledger 236.

Each peer 220, 230 maintains its own private IoT database 222, 232 that stores data pertaining to its own events. Data from databases 222, 232 is available for private ledgers 224, 234, respectively. pblocks are sent from private ledgers 224, 234.

Figure 3:
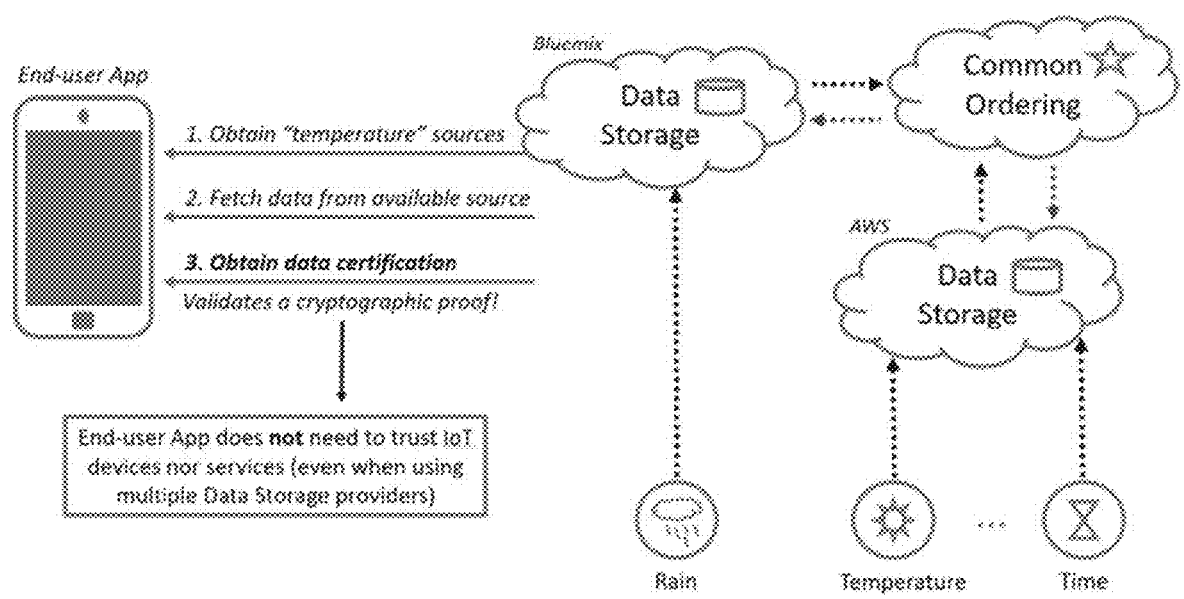
FIG. 3 illustrates an example for a weather application where the order of registration matters and ordering is verified by a client application via data certification, according to example embodiments.

FIG. 3 illustrates an example 300 for a weather application where the order of registration matters and ordering is verified by a client application via data certification, according to example embodiments. An advantage of some embodiments is that clients of cloud storage platforms are able to validate that data was stored at the time described, and that only one measurement is made for the same IoT device per measurement type (e.g., temperature, etc.) at a given point in time. This validation can be made in the form of a cryptographic proof, usually known as a Merkle proof. Because the data is cryptographically linked, first on the private ledger of each IoT cloud storage device (i.e., peer) and then the current hash of the private ledger settled on the shared ledger, a cryptographic proof can be generated to demonstrate that the value was settled in the private ledger of a peer provided at a previous time.

Figure 4:
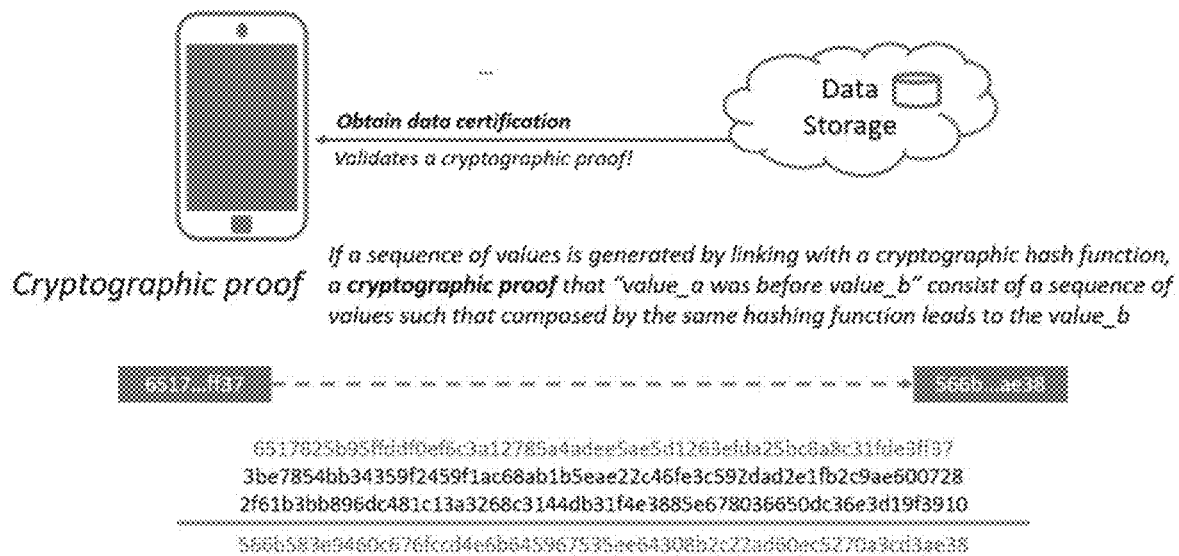
FIG. 4 illustrates an example of a cryptographic proof for data certification, according to example embodiments.

FIG. 4 illustrates an example 400 of a cryptographic proof for data certification, according to example embodiments. Consider the example where the client application seeks to compare whether a temperature value was registered between two weather conditions registered in different cloud storages. The client application can request a cryptographic proof pertaining to the temperature from one peer on the first cloud storage. This cryptographic proof is a sequence of hash values that, when hashing that sequence, ends up in a current hash value of the shared ledger. For instance, this may be in a "from, to, prevhash, m digest, #measurements" that was settled in the shared ledger. The client application can then ask for the same cryptographic proof for the two weather conditions from a peer on the second cloud storage and obtain two cryptographic hash proofs. When hashing these two sequences, the client application obtains two hash values that refer to a "from, to, prevhash, m digest, #measurements" settled in the shared ledger.

With these three hash values on the shared ledger, the client application can request a cryptographic proof of their relative order from any peer of any cloud storage. As the shared ledger is cryptographically linked, suppose the hash value of the weather condition leads to a "from, to, prevhash, m digest, #measurements" that was settled before the other two hash values. From that current hash, the peer can provide all of the current hashes that are between that settlement, the settlement associated with the temperature, and from the temperature to the settlement of the second weather condition. If it were the case that the settlement of the temperature was made before the two weather conditions, the peer would not be able to provide a sequence of hash values starting on the settlement of the weather condition that, when hashed, gives the value of the settlement of the temperature.

Figure 5:
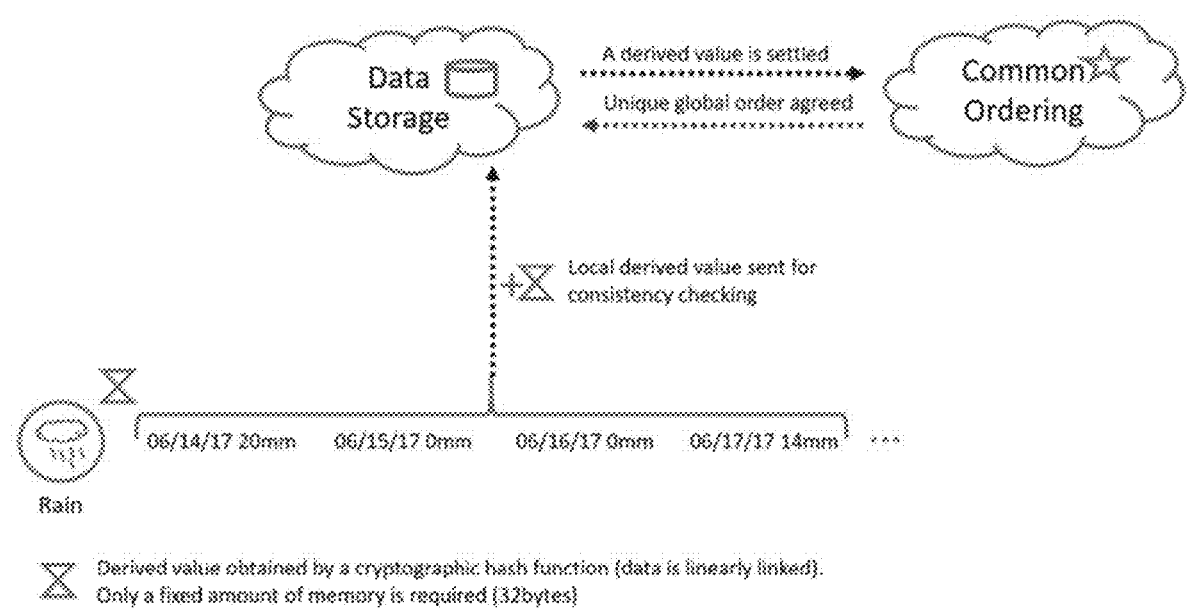
FIG. 5 illustrates an example of agreement on a common ordering, according to example embodiments.

FIG. 5 illustrates an example 500 of agreement on a common ordering, according to example embodiments. The unique global ordered is agreed on the shared ledger. In some embodiments, this can be though an enhanced Hyperledger Fabric in which peers belonging to the same organization, in addition to generating the shared ledger, maintain a private ledger between the peers of the organization. Also, the settlement that is made on the shared ledger is based on data that was first settled on the private ledgers of each organization. The way data is derived for settlement from the private ledger to the shared ledgers guarantees uniqueness of each measurement (e.g., at most one temperature was registered for a given device and time), as well as the uniqueness of the global unique order of all measurements.

Figure 6:
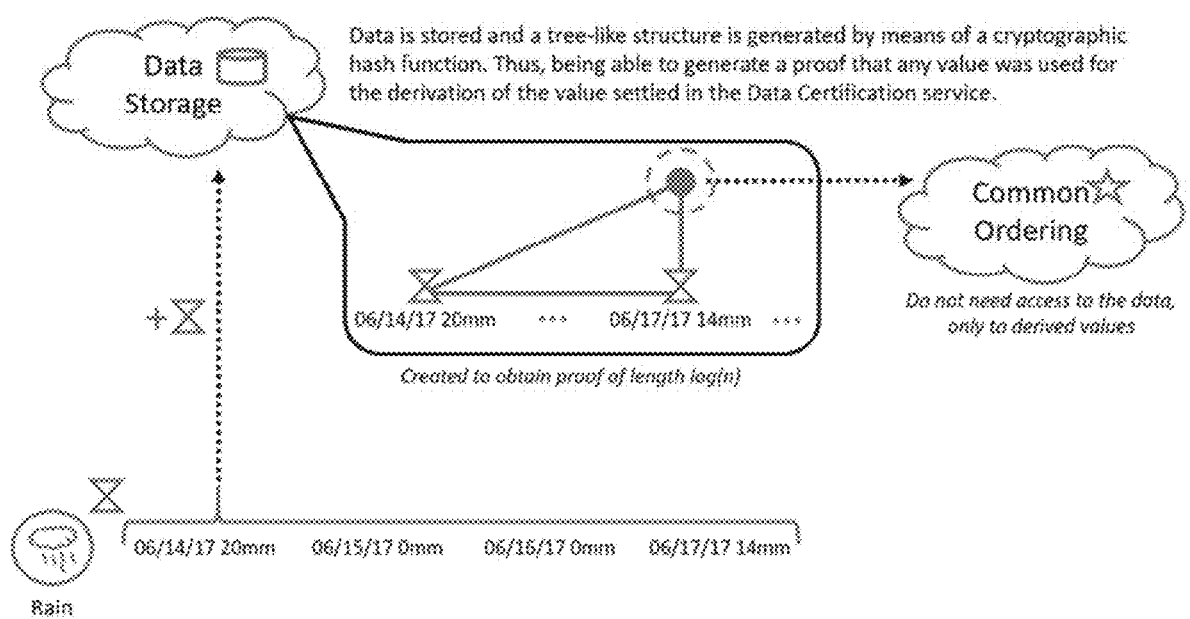
FIG. 6 illustrates an example of how the current hash is sent, according to example embodiments.

FIG. 6 illustrates an example 600 of how the current hash is sent, according to example embodiments. More specifically, FIG. 6 shows how the current hash of the private ledger is sent for settlement on the shared ledger, and not the actual measurements provided by the IoT devices. Indeed, the IoT device measurements are not included in the shared ledger.

Figure 7:
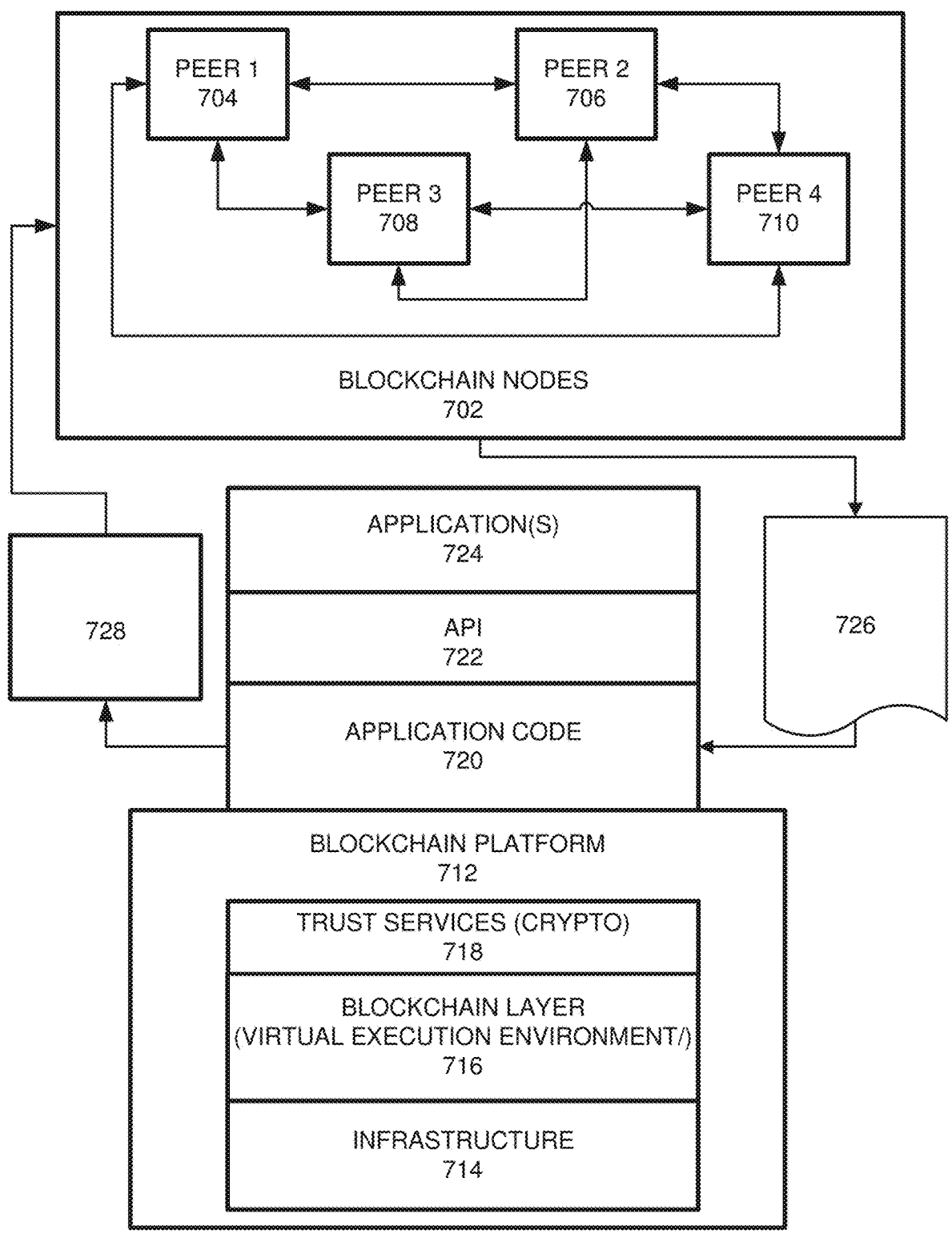
FIG. 7 illustrates an example peer node blockchain architecture configuration for an asset sharing scenario, according to example embodiments.

FIG. 7 illustrates a blockchain architecture configuration 700, according to example embodiments. The blockchain architecture 700 may include certain blockchain elements, for example, a group of blockchain nodes 702. The blockchain nodes 702 may include one or more nodes 704-710 (4 nodes are depicted here by example only). These nodes participate in a number of activities, such as blockchain transaction addition and the validation process (consensus). One or more of the blockchain nodes 704-710 may endorse transactions and may provide an ordering service for all blockchain nodes in the architecture 700. A blockchain node may initiate a blockchain authentication and seek to write to a blockchain immutable ledger stored in blockchain layer 716, a copy of which may also be stored on the underpinning physical infrastructure 714. The blockchain configuration may include applications 724, which are linked to application programming interfaces (APIs) 722 to access and execute stored program/application code 720 (e.g., chaincode, smart contracts, etc.) and can be created according to a customized configuration sought by participants and can maintain their own state, control their own assets, and receive external information. This can be deployed as a transaction and installed, via appending to the distributed ledger, on all blockchain nodes 704-710.

The blockchain base or platform 712 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 716 may expose an interface that provides access to the virtual execution environment necessary to process the program code and engage the physical infrastructure 714. Cryptographic trust services 718 may be used to verify transactions such as asset exchange transactions and keep information private.

The blockchain architecture configuration of FIG. 7 may process and execute program/application code 720 via one or more interfaces exposed, and services provided, by blockchain platform 712. The code 720 may control blockchain assets. For example, the code 720 can store and transfer data, and may be executed by nodes 704-710 in the form of a smart contract and associated chaincode with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, information 726 pertinent to providing a one-step transaction submission in a blockchain network where committed transactions had to fulfill a policy may be processed by one or more processing entities (e.g., virtual machines) included in the blockchain layer 716. The result 728 may include information indicating that a number of peers agree on the transaction results. The physical infrastructure 714 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A chaincode may include the code interpretation of a smart contract, with additional features. As described herein, the chaincode may be program code deployed on a computing network, where it is executed and validated by chain validators together during a consensus process. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

Figure 8:
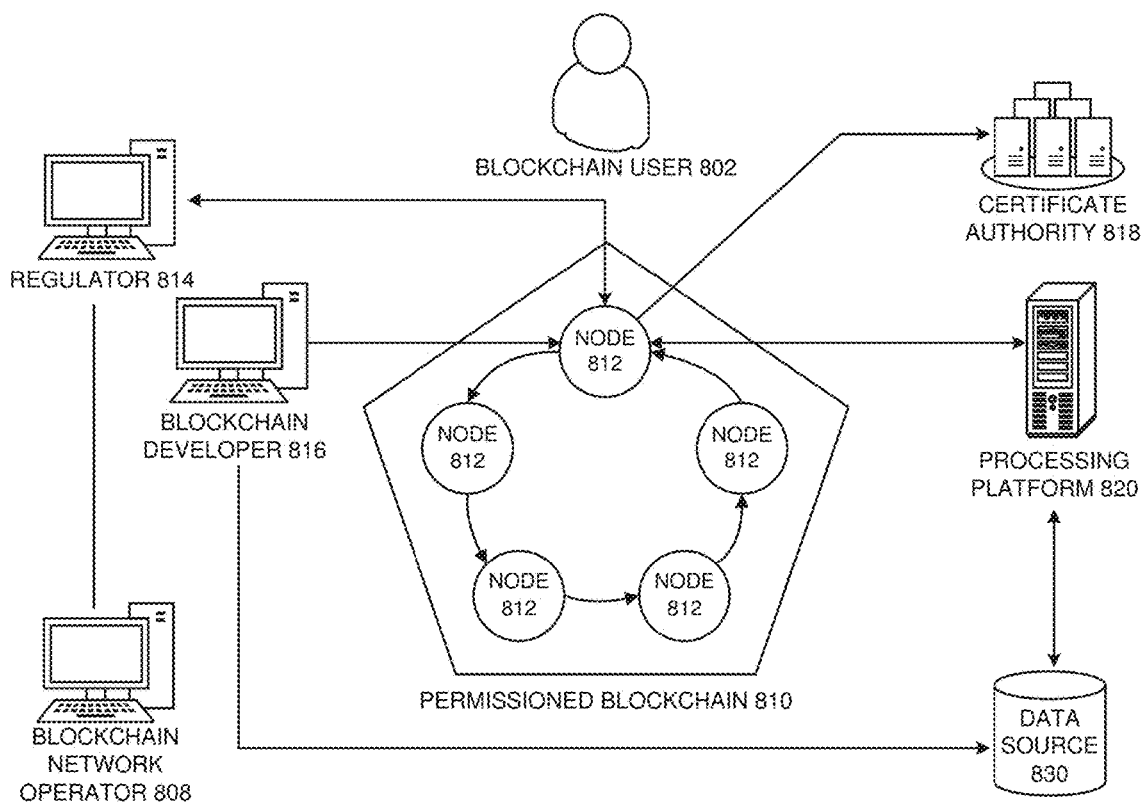
FIG. 8 is a diagram illustrating a permissioned blockchain network, according to example embodiments.

FIG. 8 illustrates an example of a permissioned blockchain network 800, which features a distributed, decentralized peer-to-peer architecture, and a certificate authority 818 managing user roles and permissions. In this example, the blockchain user 802 may submit a transaction to the permissioned blockchain network 810. In this example, the transaction can be a deploy, invoke or query, and may be issued through a client-side application leveraging an SDK, directly through a REST API, or the like. Trusted business networks may provide access to regulator systems 814, such as auditors (the Securities and Exchange Commission in a U.S. equities market, for example). Meanwhile, a blockchain network operator system of nodes 808 manage member permissions, such as enrolling the regulator system 810 as an "auditor" and the blockchain user 802 as a "client." An auditor could be restricted only to querying the ledger whereas a client could be authorized to deploy, invoke, and query certain types of chaincode.

A blockchain developer system 816 writes chaincode and client-side applications. The blockchain developer system 816 can deploy chaincode directly to the network through a REST interface. To include credentials from a traditional data source 830 in chaincode, the developer system 816 could use an out-of-band connection to access the data. In this example, the blockchain user 802 connects to the network through a peer node 812. Before proceeding with any transactions, the peer node 812 retrieves the user's enrollment and transaction certificates from the certificate authority 818. In some cases, blockchain users must possess these digital certificates in order to transact on the permissioned blockchain network 810. Meanwhile, a user attempting to drive chaincode may be required to verify their credentials on the traditional data source 830. To confirm the user's authorization, chaincode can use an out-of-band connection to this data through a traditional processing platform 820.

Figure 9:
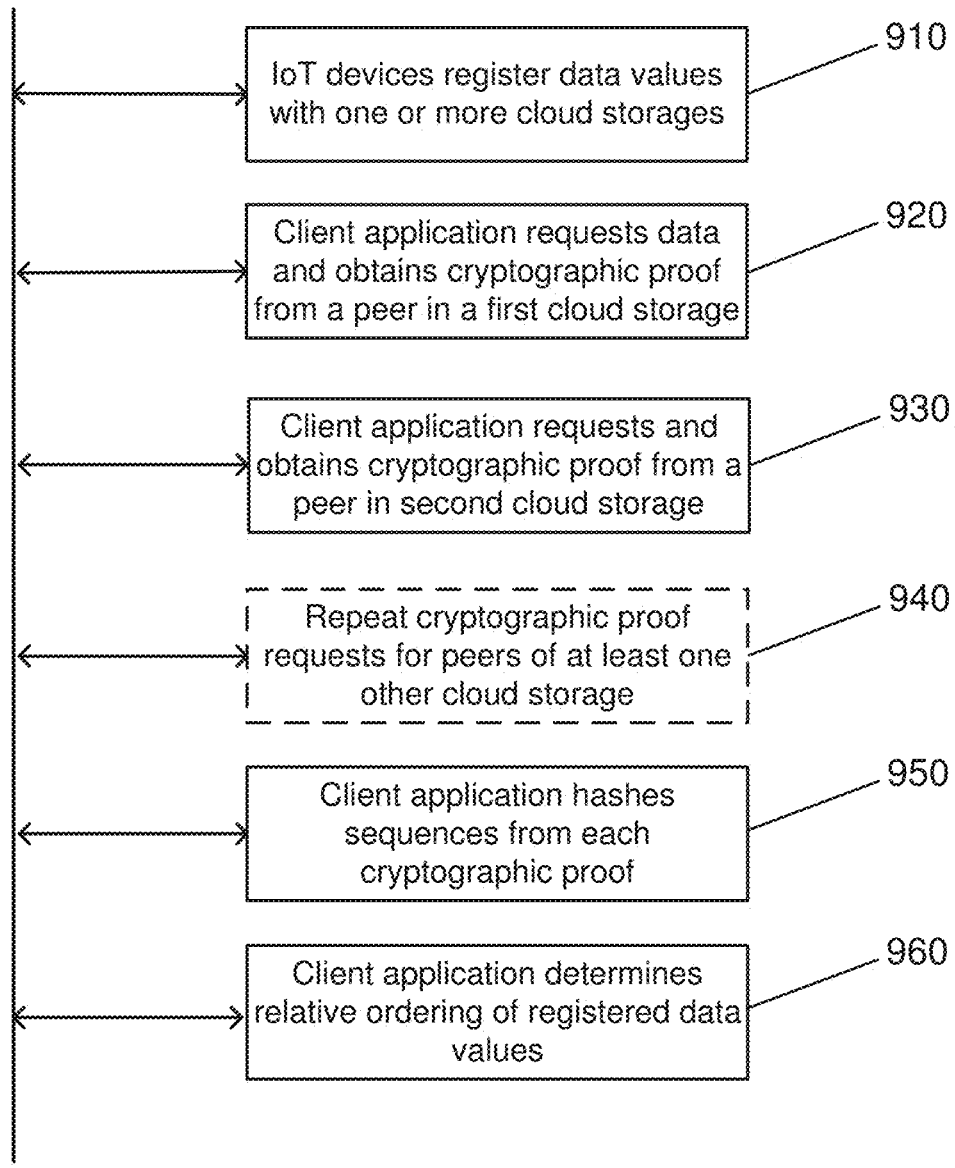
FIG. 9 illustrates a flow diagram of an example method for providing IoT data certification as a service powered by a permissioned blockchain network, according to example embodiments.

FIG. 9 illustrates a flow diagram of an example method 900 for providing IoT data certification as a service powered by a permissioned blockchain network, according to example embodiments. The process begins with one or more IoT devices registering data values with one or more cloud storages at 910. It should be noted that in some embodiments, some or all of the devices registering data (i.e., data uploaders or data producers) to be stored on a cloud storage platform need not be IoT devices, but instead could be any suitable computing system (e.g., personal computers, servers, mobile phones, etc.). In this case, it is assumed that the order of registration of the data with respect to other data matters (e.g., as is the case in the context of a weather application). This enables client applications of cloud storage platforms to validate that data was stored at the time described, and that only one measurement is made for the same IoT device per measurement type at a given point in time.

In the context presented herein, devices maintaining the private ledgers are not peers of the blockchain network. Peers belonging to the same cloud storage generate a private ledger with the data provided by IoT devices, and those peers also maintain a shared ledger with the peers of the other cloud storage. It should be noted that peers that maintain the private ledger may be different than peers that maintain the shared ledger in some embodiments. Each peer also includes a private IoT database, a private ledger, and a common, or shared, ledger. The private IoT database stores data pertaining to data uploaded by data producers and the peer's own events. This data is available for the peer's private ledger.

Per the above, data producers may be IoT devices in some embodiments. The type of database that is used may be determined by each cloud storage platform, and the present embodiments are not limited to just one database. Indeed, one or more of the cloud storages may use several databases to store the data uploaded by data producers. The settlement made in the private ledger references the medium in which the corresponding data was stored in some embodiments.

However, instead of interchanging the actual data provided by IoT devices, the information settled on the shared ledger includes other data in a common form (e.g., "from-to, prevhash, m digest, #measurements"). "from-to" is the next period to settle on the shared ledger, "prevhash" corresponds to the current hash of the private ledger, "m digest" corresponds to the hash calculated for all the entries made on the private ledger in such a period and the number of measurements (i.e., the number of data measurements provided by IoT devices) in such a period.

The client application may then seek to prove a common ordering of the data from the multiple cloud storages, which each have at least one peer device, per the above. In other words, the client application may seek to compare where the data value registered at step 910 falls within the ordering of other data values registered in the multiple cloud storages. The client application then requests the actual data (i.e., the data that was registered by the IoT device and/or other IoT devices) and cryptographic proofs that such data was already stored on the platform and not generated when it was requested by the client application at 920. This cryptographic proof is a sequence of hash values that, when hashing that sequence, ends up in a current hash value of the shared ledger. For instance, this may be in a "from, to, prevhash, m digest, #measurements" that was settled in the shared ledger, per the above. In general terms, the data that is settled in the shared ledger corresponds to derived information settled in the private ledgers. That derived information is then used to construct cryptographic proofs relating data uploaded by data producers, private ledgers, and the shared ledger.

The cryptographic proof may be used to determine the relative order of the data that is stored, even when the data is stored in different cloud storage platforms. These proofs provide evidence that the data was already stored in the cloud platform (i.e., evidenced by the private ledger). That is, the proofs demonstrate that data was included in a < from, to, . . . > that was then settled in the shared ledger. Then, any peer of a cloud storage can provide a proof that such <from, to, . . . > was indeed settled in the shared ledger, or even provide proof of the relative order of two <from, to, . . . >, which can in turn used to finally demonstrate the relative order of data stored in the cloud platforms.

The client application then requests the same cryptographic proof from a peer on a second cloud storage at 930, and thus obtains two cryptographic hash proofs. This process may be repeated for a peer on a third cloud storage, a fourth cloud storage, etc. at 940 in order to generate a larger sampling of cryptographic proofs. In some embodiments, the cryptographic proofs may be Merkle proofs.

Because the data is cryptographically linked, first on the private ledger of each peer and then the current hash of the private ledger settled on the shared ledger, a cryptographic proof can be generated to demonstrate that the value was settled in the private ledger of a peer provided at a previous time. The current hash may be the hash of the last block of the shared ledger.

The client application then hashes the sequences from the cryptographic proofs from each cloud storage at 950. This results in a hash value that refers to a "from, to, prevhash, m digest, #measurements" settled in the shared ledger, for example. With this hash value and those from the cryptographic proofs, all of which are on the shared ledger, the client application can thus essentially request a cryptographic proof of their relative order from any peer of any cloud storage. The client application then determines the relative ordering of the registered data values at 960.

The shared ledger is updated only upon agreement by peers belonging to different cloud storages. It should be noted that the shared ledger is not necessarily updated in the flow in which a client application attempts to verify the data stored in the cloud storages or to determine the order with respect to two pieces of data.

Figure 10A:
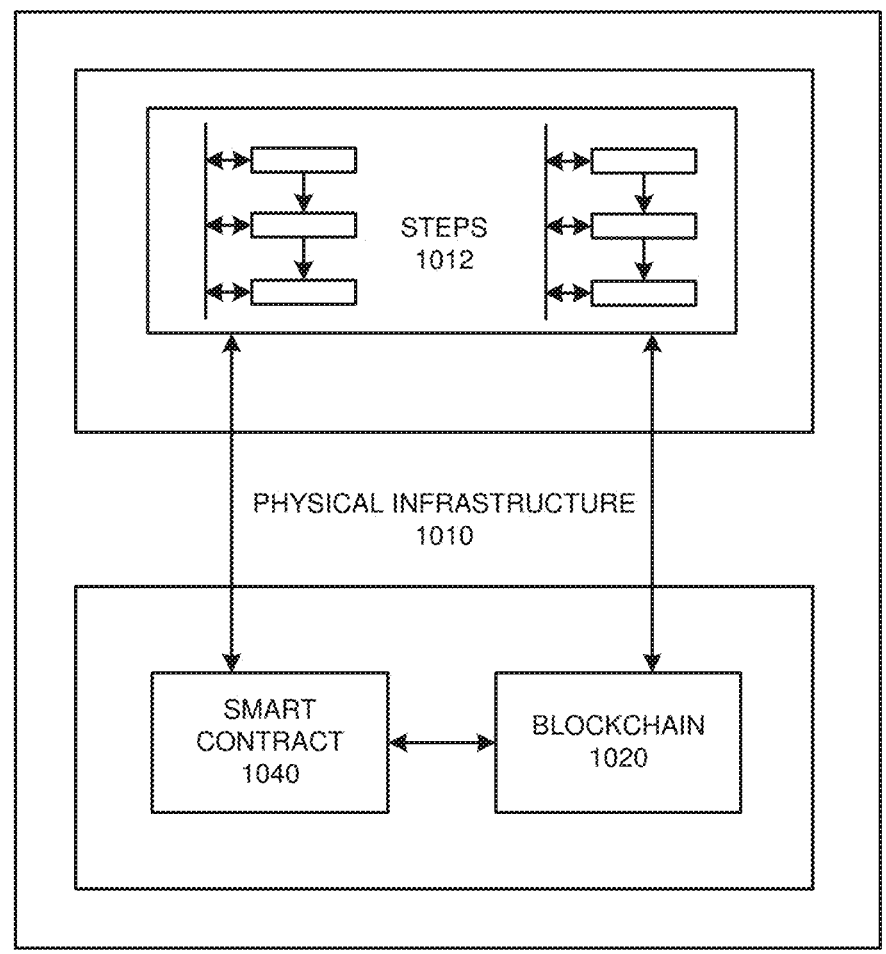
FIG. 10A illustrates an example physical infrastructure configured to perform various operations on the blockchain in accordance with one or more operations described herein, according to example embodiments.

FIG. 10A illustrates an example physical infrastructure configured to perform various operations on the blockchain in accordance with one or more of the example methods of operation according to example embodiments. Referring to FIG. 10A, the example configuration 1000 includes a physical infrastructure 1010 with a blockchain 1020 and a smart contract 1040, which may execute any of the operational steps 1012 included in any of the example embodiments. The steps/operations 1012 may include one or more of the steps described or depicted in one or more flow diagrams and/or logic diagrams. The steps may represent output or written information that is written or read from one or more smart contracts 1040 and/or blockchains 1020 that reside on the physical infrastructure 1010 of a computer system configuration. The data can be output from an executed smart contract 1040 and/or blockchain 1020. The physical infrastructure 1010 may include one or more computers, servers, processors, memories, and/or wireless communication devices.

Figure 10B:
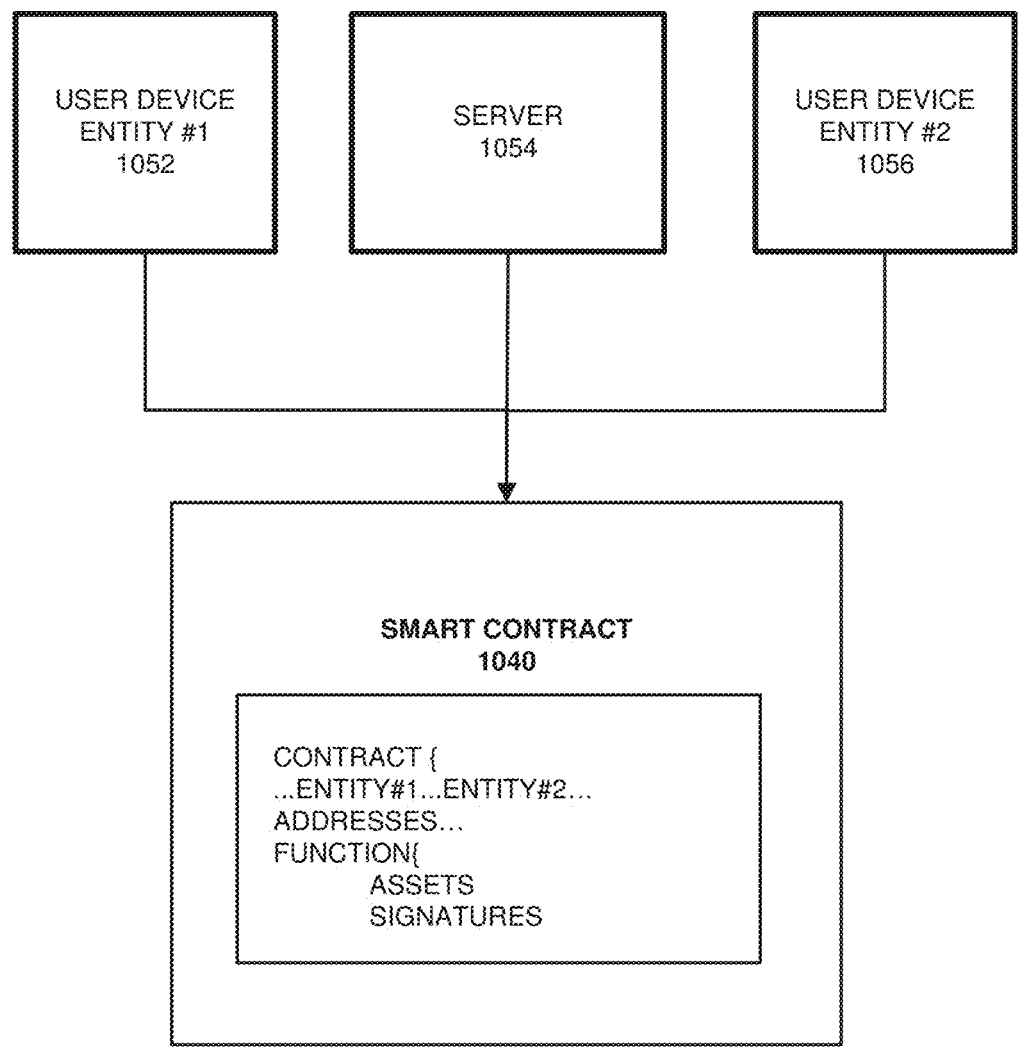
FIG. 10B illustrates an example smart contract configuration among contracting parties and a mediating server configured to enforce smart contract terms on a blockchain, according to example embodiments.

FIG. 10B illustrates an example smart contract configuration among contracting parties and a mediating server configured to enforce the smart contract terms on the blockchain according to example embodiments. Referring to FIG. 10B, the configuration 1050 may represent a communication session, an asset transfer session or a process or procedure that is driven by a smart contract 1040 which explicitly identifies one or more user devices 1052 and/or 1056. The execution, operations and results of the smart contract execution may be managed by a server 1054. Content of the smart contract 1040 may require digital signatures by one or more of the entities 1052 and 1056 which are parties to the smart contract transaction. The results of the smart contract execution may be written to a blockchain as a blockchain transaction.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 11 illustrates an example computer system architecture 1100, which may represent or be integrated in any of the above-described components, etc.

Figure 11:
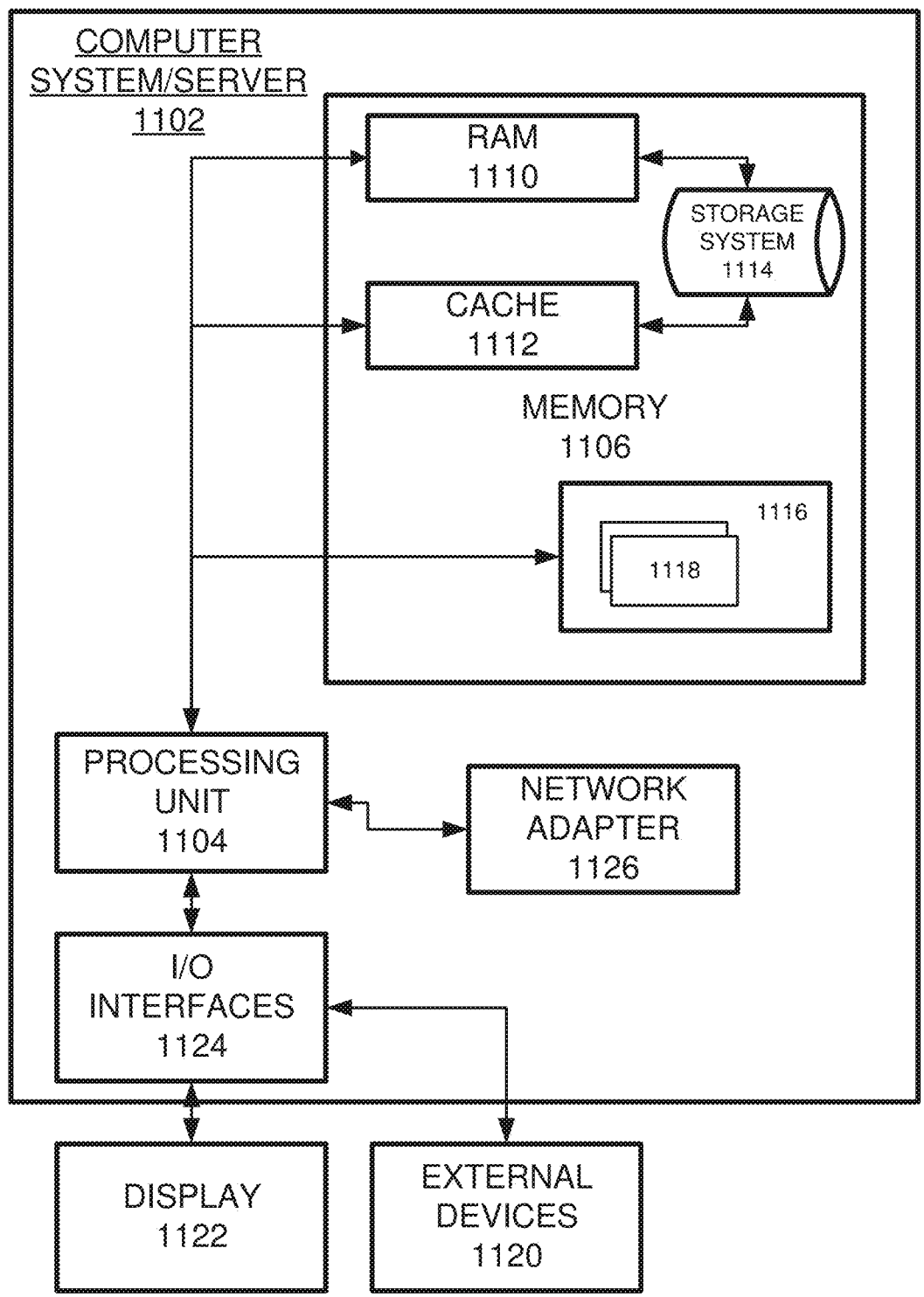
FIG. 11 illustrates an example computer system configured to support one or more of the example embodiments.

FIG. 11 is not intended to suggest any limitation as to the scope of use or functionality of embodiments of the application described herein. Regardless, the computing node 1100 is capable of being implemented and/or performing any of the functionality set forth hereinabove.

In computing node 1100 there is a computer system/server 1102, which is operational with numerous other general purpose or special purpose computing system environments or configurations. Examples of well-known computing systems, environments, and/or configurations that may be suitable for use with computer system/server 1102 include, but are not limited to, IoT devices, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1102 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 1102 in cloud computing node 1100 is shown in the form of a general-purpose computing device. The components of computer system/server 1102 may include, but are not limited to, one or more processors or processing units 1104, a system memory 1106, and a bus that couples various system components including system memory 1106 to processor 1104.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media. System memory 1106, in one embodiment, implements the flow diagrams of the other figures. The system memory 1106 can include computer system readable media in the form of volatile memory, such as random-access memory (RAM) 1110 and/or cache memory 1112. Computer system/server 1102 may further include other removable/non-removable, volatile/non-volatile computer system storage media. By way of example only, storage system 1114 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 1106 may include at least one program product having a set (e.g., at least one) of program modules that are configured to carry out the functions of various embodiments of the application.

Program/utility 1116, having a set (at least one) of program modules 1118, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. Program modules 1118 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 1102 may also communicate with one or more external devices 1120 such as a keyboard, a pointing device, a display 1122, etc.; one or more devices that enable a user to interact with computer system/server 1102; and/or any devices (e.g., network card, modem, etc.) that enable computer system/server 1102 to communicate with one or more other computing devices. Such communication can occur via I/O interfaces 1124. Still yet, computer system/server 1102 can communicate with one or more networks such as a local area network (LAN), a general wide area network (WAN), and/or a public network (e.g., the Internet) via network adapter 1126. As depicted, network adapter 1126 communicates with the other components of computer system/server 1102 via a bus. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A system, comprising:
a processor configured to:
obtain, via a shared ledger, a first block hash corresponding to a first data value which is registered on the shared ledger from a private ledger and a second block hash corresponding to a second data value registered on the shared ledger from a different private ledger,
determine a relative order of the registration of the first and second data values on the shared ledger based on the first and second block hashes, and
provide information about the relative ordering of the first and second data values registered from the private ledgers.

2. The system of claim 1, wherein the shared ledger comprises a permissioned blockchain network.

3. The system of claim 1, wherein the first data value and the first block hash are registered by a first cloud storage and the second data value and the second block hash are registered by a second cloud storage.

4. The system of claim 3, wherein the first cloud storage and the second cloud storage comprise peers that maintain the shared ledger.

5. The system of claim 4, wherein the first and second data values settled in the shared ledger comprises data in a form ("from-to, prevhash, m digest, or #measurements"), where "from-to" is a next period to settle on the shared ledger, "prevhash" corresponds to a current hash of the private ledger, "m digest" corresponds to a hash calculated for all entries made on the private ledger in a period and a number of measurements in the period.

6. The system of claim 3, wherein each peer comprises:
a private database comprising data pertaining to data recorded by data producers and the peer's own events, the data being available to the private ledger of the peer.

7. The system of claim 1, wherein the first and second block hashes each comprise a sequence of hash values that, when hashing that sequence, ends up in a current hash value of the shared ledger.

8. The system of claim 7, wherein the current hash is a hash of a last block of the shared ledger.

9. The system of claim 1, wherein the relative order of the first and second data values is an order in which the first and second data values are stored on two different cloud storage platforms.

10. The system of claim 1, wherein the first and second block hashes each comprise Merkle proofs that are created by a sequence of hashes on the shared ledger.

11. The system of claim 1, wherein the first and second data are captured by first and second IoT devices, respectively.

12. A method, comprising:
obtaining, via a shared ledger, a first block hash corresponding to a first data value which is registered on the shared ledger from a private ledger and a second block hash corresponding to a second data value registered on the shared ledger from a different private ledger;
determining a relative order of the registration of the first and second data values on the shared ledger based on the first and second block hashes; and
provide information about the relative ordering of the first and second data values registered from the private ledgers.

13. The method of claim 12, wherein the first data value and the first block hash are registered by a first cloud storage, and the second data value and the second block hash are registered by a second cloud storage.

14. The method of claim 13, wherein the first and second cloud storages comprise peers that maintain the shared ledger.

15. The method of claim 12, wherein the first and second hash values each comprise a sequence of hash values that, when hashing that sequence, ends up in a current hash value of the shared ledger.

16. The computer-implemented method of claim 15, wherein the first and second data values settled in the shared ledger each comprise data in a form ("from-to, prevhash, m digest, or #measurements"), where "from-to" is a next period to settle on the shared ledger, "prevhash" corresponds to a current hash of the private ledger, "m digest" corresponds to a hash calculated for all entries made on the private ledger in a period and a number of measurements in the period.

17. A non-transitory computer-readable medium comprising instructions, that when read by a processor, cause the processor to perform a method comprising:
- obtaining, via a shared ledger, a first block hash corresponding to a first data value which is registered on the shared ledger from a private ledger and a second block hash corresponding to a second data value registered on the shared ledger from a different private ledger;
- determining a relative order of the registration of the first and second data values on the shared ledger based on the first and second block hashes; and
- provide information about the relative ordering of the first and second data values registered from the private ledgers.

18. The non-transitory computer-readable medium of claim 17, wherein the first data value and the first block hash are registered by a first cloud storage, and the second data value and the second block hash are registered by a second cloud storage.

\* \* \* \* \*